United States Patent
Dudley

[19]

[11] Patent Number: 6,095,743
[45] Date of Patent: Aug. 1, 2000

[54] LEVELING APPARATUS FOR LOADING AND LEVELING FLOWABLE METAL CHIP SCRAP IN SHIPPING CONTAINER

[76] Inventor: Russell D. Dudley, 3916 Old Field Trail, Kalamazoo, Mich. 49008

[21] Appl. No.: 09/121,220

[22] Filed: Jul. 23, 1998

[51] Int. Cl.[7] .................................................. B65F 9/00
[52] U.S. Cl. ........................................ 414/398; 198/861.5
[58] Field of Search ..................................... 414/500, 398, 414/399, 809, 812; 198/668, 670, 671, 860.3, 861.5, 635; 100/215

[56] References Cited

U.S. PATENT DOCUMENTS

| | | | |
|---|---|---|---|
| 134,330 | 12/1872 | Threfall | 414/393 |
| 399,188 | 3/1889 | Dieter | 198/861.5 |
| 556,456 | 3/1896 | Bouillotte | 414/571 |
| 1,766,619 | 6/1930 | Fitch | 191/36 |
| 3,517,608 | 6/1970 | Tezuka | 110/215 |
| 3,871,163 | 3/1975 | Kanengieter et al. | 56/344 |
| 3,955,492 | 5/1976 | Topoly | 100/215 |
| 4,344,272 | 8/1982 | Gaudette et al. | 100/215 |
| 4,840,532 | 6/1989 | Galbreath | 414/479 |
| 4,859,135 | 8/1989 | Neufeldt | 414/572 |
| 5,026,240 | 6/1991 | Kozierok et al. | 414/300 |
| 5,181,463 | 1/1993 | Lackner | 100/215 |
| 5,421,535 | 6/1995 | Hemmert et al. | 242/471 |
| 5,458,452 | 10/1995 | Pellegrini | 414/406 |
| 5,570,630 | 11/1996 | Molitorisz et al. | 100/3 |
| 5,651,655 | 7/1997 | Fullbright | 414/498 |
| 5,722,604 | 3/1998 | Dudley | 241/24.11 |
| 5,848,869 | 12/1998 | Slocum et al. | 414/500 |
| 5,913,561 | 6/1999 | Alcorn | 296/100.1 |

OTHER PUBLICATIONS

Exhibit A is a sheet entitled Processed Chip Storage, which is prior art available more than one year prior to filing the present application.

*Primary Examiner*—Dean J. Kramer
*Assistant Examiner*—Paul Chin
*Attorney, Agent, or Firm*—Price Heneveld Cooper DeWitt and Litton

[57] ABSTRACT

A scrap handling system includes a bay having an area for receiving an open-topped roll-off container, a feeder conveyor for conveying non-balling, flowable, metal chip scrap to the bay, and a scrap leveler having an input end positioned to receive metal chip scrap from the feeder conveyor, and further having a screw configured to deposit the metal chip scrap in the container and to engage the metal chip scrap as the scrap is deposited to distribute and level the metal chip scrap in the container. A leveler support pivotally supports the leveler at the input end, and a lift is attached to the other end and is configured to move the scrap leveler between a raised position providing room to remove and replace the container, and a lowered position positioning the leveler parallel a top of the container to level the metal chip scrap as the metal chip scrap is deposited. Angled side sections extend laterally on the housing at least to side walls of the container for covering the open top of the container to prevent rain and snow from entering the top. A method related to the above is also disclosed.

18 Claims, 1 Drawing Sheet

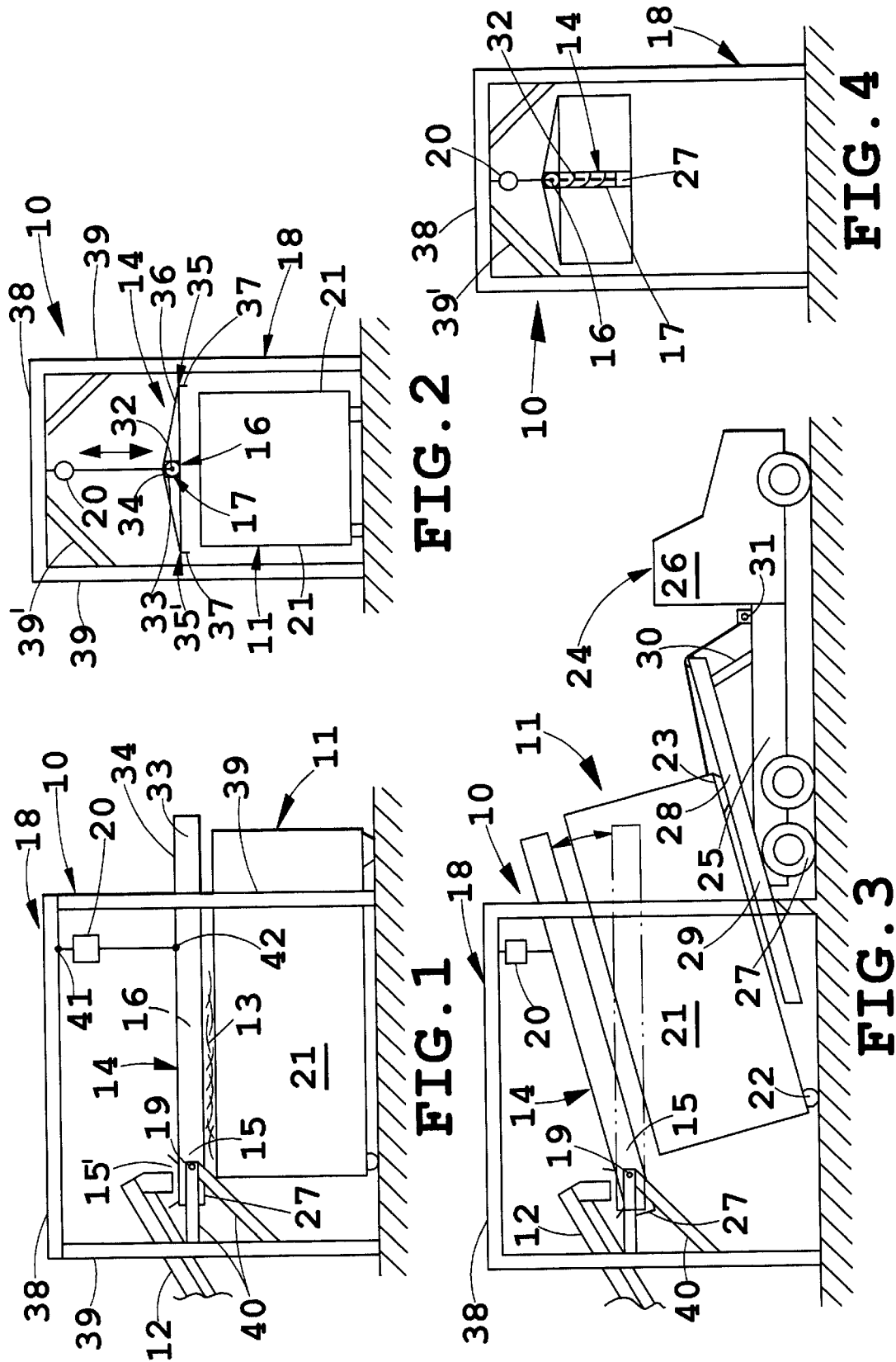

LEVELING APPARATUS FOR LOADING AND LEVELING FLOWABLE METAL CHIP SCRAP IN SHIPPING CONTAINER

BACKGROUND OF THE INVENTION

The present invention concerns an overhead leveling apparatus for loading and leveling flowable metal chip scrap in a roll-off shipping container, the leveling apparatus being configured to facilitate removal and replacement of the container, particularly when the container is lifted and rolled onto a transport vehicle as part of removing the container.

Flowable metal chip scrap, such as fine metal chips, broken chips and short shavings from machining and metal working operations, is commonly collected and loaded into containers for shipment to recycling centers. A problem is that the metal chip scrap is difficult to handle because it piles up in heaps and mounds. This results in containers that are only partially filled.

Chip leveling screw apparatus have been used in the past to distribute metal chips along a length of open-topped highway trailers. In these apparatus, a screw housing is provided having an open bottom so that as the chip mound builds in the trailer, the top of the mound is naturally pushed forward by the bottom of the screw. This arrangement allows for complete unattended filling of the trailer. The aforementioned leveling screw works well as long as the container being loaded can be removed in a fashion so as not to collide or interfere with the chip leveling screw. Since a conventional highway trailer may be removed essentially parallel to the distribution screw, there is no interference. However, where a roll-off type container is used, there is interference because the roll-off container is loaded by lifting and raising the container along an incline onto a truck adapted to carry it.

Another problem with roll-off containers is that the roll-off containers necessarily have an open top for receiving metal chip scrap dumped into the container. The roll-off container may set in the loading area for significant periods of time. This frequently results in a problem of accumulating rainwater or snow within the container. This creates problems by washing off retained cutting fluids and in some instances, such as in colder climates, the chips and metal chip scrap freeze within the container making it difficult to empty. Nonetheless, buildings to house the roll-off containers during loading are expensive and can become very messy over time.

Accordingly, a scrap handling apparatus is desired solving the aforementioned problems, but that also further has the aforementioned advantages.

SUMMARY OF THE INVENTION

In one aspect of the present invention, a scrap handling system adapted to load and level non-balling, flowable metal chip scrap in a roll-off container having an open top includes a scrap leveler configured to handle and deposit metal chip scrap in the container and also to distribute the metal chip scrap previously deposited in the container, and a support pivotally supporting the scrap leveler. The support includes a lift configured to move the scrap leveler between a raised position providing room to lift, remove, and replace the container, and a lowered position positioning the leveler proximate and parallel the open top to deposit and evenly distribute the metal chip scrap in the container.

In another aspect, a scrap handling system for loading and leveling non-balling, flowable, metal chip scrap in an open-topped container includes a support, and a leveler having an elongated housing with an input end pivoted to the support, an opposite end, and an open bottom. The leveler further includes a rotatable screw configured to deposit metal chip scrap into the container and to engage the metal chip scrap as the metal chip scrap is deposited to better distribute the metal chip scrap throughout the container. The screw and the open bottom of the housing are configured to facilitate moving the metal chip scrap toward an opposite end as a first end of the container becomes filled. A lift is connected to the opposite end of the housing for moving the scrap leveler between a raised position that provides room to lift, remove, and replace the container, and a lowered position that positions the leveler to deposit and spread the metal chip scrap toward an unfilled end of the container.

In yet another aspect, an apparatus includes a bay having an area for receiving a roll-off container having side walls defining an open top, a feeder conveyor for conveying non-balling, flowable, metal chip scrap to the bay, and a scrap leveler including an input end positioned to receive metal chip scrap from the feeder conveyor. The scrap leveler further includes a screw configured to engage the metal chip scrap as the metal chip scrap is deposited in the container to distribute and level the metal chip scrap in the container, and still further includes side sections that extend laterally from the screw for covering the open top out to the side walls. A leveler support pivotally supports the leveler at the input end, and a lift is provided that is configured to move the scrap leveler between a raised position providing room to lift, remove, and replace the container, and a lowered position positioning the leveler to deposit the metal chip scrap in the container and to engage the metal chip scrap as the metal chip scrap is deposited in the container to level the metal chip scrap.

In still another aspect, a method comprises steps of providing an area for an open-topped container and providing a leveler movably positioned in the area for movement between a raised position that creates room to lift, remove, and replace the container, and a lowered position that positions the leveler to deposit non-balling, flowable, metal chip scrap in the container and to engage metal chip scrap in the container to level the metal chip scrap. The method further includes steps of moving the leveler to the lowered position and into a position generally parallel a top of the container, operating the leveler to deposit and also level metal chip scrap in the container, moving the leveler to the clearance position, and removing the container, including lifting at least part of the container to haul the container away. The step of lifting the container is done after moving the leveler to the clearance position so that the container does not strike the leveler as the container is lifted and moved away.

These and other aspects, objects, and advantages of the present invention will be further understood and appreciated by those skilled in the art upon study of the present specification, claims, and appended drawings.

DESCRIPTION OF DRAWINGS

FIG. 1 is a side view of a scrap handling system embodying the present invention, including a roll-off container positioned to receive non-balling, flowable, metal chip scrap and a leveler in a lowered positioned for filling the container and for leveling the metal chip scrap in the container;

FIG. 2 is an end view of the apparatus of FIG. 1;

FIG. 3 is a side view similar to FIG. 1, but showing the leveler in a raised position and showing the container raised at an angle and pulled partially onto a truck bed for hauling the container away; and FIG. 4 is an end view of FIG. 3, with the haul-away truck and roll-off container removed to better show the scrap handling system.

DETAILED DESCRIPTION OF PREFERRED EMBODIMENT

A scrap handling system 10 (FIG. 1) includes a bay having an area for receiving an open-topped roll-off container 11, a feeder conveyor 12 for conveying non-balling, flowable, metal chip scrap 13 to the bay to fill the container 11, and a scrap leveler 14 for depositing and also leveling metal chip scrap 13 in the container 11 as the container 11 is filled. The leveler 14 has an input end 15 with an open chute 15' positioned to receive metal chip scrap 13 from the feeder conveyor 12, and further has a screw 16 positioned in an open bottomed housing 17 configured to deposit metal chip scrap 13 into the container 11 and to engage a top of a pile of the metal chip scrap 13 to distribute and level the container 11 as the pile is created. A leveler support 18 pivotally supports the leveler 14 at location 19 at the input end 15, and a lift 20 is configured to move the scrap leveler 14 between a raised position providing room to lift, remove, and replace the container 11, and a lowered position positioning the leveler 14 to deposit metal chip scrap in the container 11 and to engage the top of deposited metal chip scrap 13 in the container 11 to level the metal chip scrap 13.

The container 11 (FIG. 1) includes side walls 21 and a bottom defining an upwardly open space for receiving metal chip scrap 13 dumped in from above. The container 11 can include relatively small wheels 22 at its rear end and a hitch or tongue 23 at its front end to facilitate loading and unloading of the container 11 onto the truck bed 25 of a truck or transport vehicle 24. The truck 24 includes a cabin 26 for the truck driver and vehicle wheels 27 for rollingly supporting the truck 24. A container carrier 28 is pivoted to the truck bed 25 at pivot 29 and is operably connected to the truck bed 25 by a power lift, such as a hydraulic cylinder and piston 30 for movement between a loading/angled position (FIG. 3), where the container 11 can be winched or pulled upwardly onto the truck bed 25, and a transporting horizontal position, where the container 11 is stably supported for transport along a road. The truck 24 includes means for pulling the container onto the truck bed, such as the winch 31 or the like.

The feeder conveyor 12 (FIG. 1) can be any one of a variety of different types of conveyors well-known in the art for transporting the metal chip scrap 13. The metal chip scrap 13 referred to herein can be any type of material, but it is contemplated that the present invention is particularly suited for elongated twisted metal strips or turnings of scrap machined or cut from raw metal stock, such as the scrap that results from machining, metal working, lathing, drilling, and the like. Due to the natural properties of the metal chip scrap 13, the metal chip scrap, particularly metal scrap, is a highly abrasive and difficult-to-handle material. The metal chip scrap 13 is dumped by the feeder conveyor 12 and leveler 14 into the container 11 usually near a rear end, where the metal chip scrap 13 collects in a pile until it raises to a level where the leveler 14 pushes it forwardly.

The leveler 14 includes a drive mechanism 27, such as a motor and drive mounted to an end of the housing 17 for rotating the screw 16. The housing 17 includes side walls 33 and a top wall 34 defining an open bottom. The screw 16 includes flutes or a spiral flange 32 adapted to move the metal chip scrap 13 forwardly in the housing 17 as the screw 16 is rotated. As the metal chip scrap 13 collects in the container 11, it fills in under the housing 17, such that the deposited metal chip scrap 13 forms a pile that supports additional metal chip scrap 13 against the screw 16 as the additional metal chip scrap 13 is introduced into the container 11. This results in the screw 16 continuing to push the "new" metal chip scrap forwardly until there is space in the container 11 to receive it. Limit switches (not shown) or other sensing means can be put on the remote end of the leveler 14 to sense when the container 11 is full for automatic shut off.

Side sections 35 and 35' (FIG. 2) are attached to housing 17 and extend laterally. The illustrated side sections 35 form a roof-like cover over the container 11, and each include an angled top wall 36 and a down flange 37 at their outer edges. The down flanges 37 are positioned above or slightly outboard of the side walls 33 of the container 11 when the leveler 14 is in its lowered position, such that the side sections 35 act as an umbrella to keep moisture out of the container 11. The down flanges 37 can also be configured and/or located to keep the metal chip scrap 13 within the container side walls 33, if desired.

The leveler support 18 includes an overhead framework 38 of interconnected beams supported by posts 39 and corner braces 39'. Angled bracing 40 is attached to the posts 39 to pivotally support the leveler 14 at pivot location 19 close to the chute 15 of input end 15. It is noted that the pivot location 19 could be in other locations as well as location 19, but the location 19 is preferred because it keeps the input end 15 in a relatively stationary position as the leveler 14 is moved between its raised and lowered positions. It is also noted that the support 18 can be located in or form an integral part of a building; however, a significant advantage of the present design is that the cost of a building can be avoided.

Lift 20 comprises a chain hoist or other means for lifting the leveler 14. The lift 20 is operably attached to the overhead framework 38 and to the housing 17 at locations 41 and 42, which locations are at an end opposite the input end 15. In the lowered position, the housing 17 of leveler 14 is located slightly above but proximate and parallels the open top of the container 11.

The method of use includes moving the leveler 14 to the lowered position on top of an empty container 11, and operating the leveler 14 to deposit metal chip scrap 13 in the container, and to level the metal chip scrap as the metal chip scrap 13 is deposited in the container 11. When the container 11 is full, the leveler 14 is moved to the raised position by lift 20 so that the container 11 can be lifted and removed. The illustrated roll-off container 11 is removed by simultaneously pulling and lifting a front end of the container 11, such that the container 11 is pulled upwardly at an angle onto the carrier 28 on the bed 25 of the truck 24. The container 11 is winched up by winch 31 onto the truck where it is anchored and then transported away. Thereafter, another empty container 11 is positioned under the leveler 14, and the process is repeated. It is noted that the present method will also work on containers that are lifted onto a transport vehicle, such as a flat bed truck/trailer or railroad car. Further, the present invention is contemplated to include moving the leveler 14 horizontally to one side in order to provide room for the container 11 to be lifted and hauled away.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A scrap handling system adapted to load and level non-balling, flowable, metal chip scrap in a roll-off container having an open top adapted to be carried on a truck, comprising:

a scrap leveler configured to handle and deposit metal chip scrap in the container and also to distribute the metal chip scrap previously deposited in the container; and a support pivotally supporting the scrap leveler, the support including a lift configured to move the scrap leveler between a raised position providing room to lift, remove, and replace the container, and a lowered position positioning the leveler proximate and parallel the open top to deposit and evenly distribute the metal chip scrap previously deposited in the container, the lift including an overhead chain hoist for lifting the container.

2. The scrap handling system defined in claim 1 wherein the scrap leveler includes a housing and the support includes brackets pivotally supporting the housing.

3. The scrap handling system defined in claim 2 wherein the lift is operably attached between the support and the housing.

4. The scrap handling system defined in claim 3 wherein the housing is elongated and includes an open bottom.

5. The scrap handling system defined in claim 4 wherein the leveler includes a screw configured to move metal chip scrap along the housing to both deposit the metal chip scrap and also level the metal chip scrap as the metal chip scrap collects in a pile.

6. The scrap handling system defined in claim 5 wherein the housing includes side sections that extend laterally from the housing of the scrap leveler and that are constructed to extend at least as far as vertical side walls of the container.

7. The scrap handling system defined in claim 6 wherein the side sections include down flanges that are positioned to be at least as far outboard from the screw as the side walls of the container.

8. The scrap handling system defined in claim 7 wherein the side sections include outwardly angled panels shaped to flow moisture such as rain or snow outwardly beyond the side walls of the container.

9. The scrap handling system defined in claim 8 wherein the housing includes an input end defining a chute for receiving metal chip scrap from a feeder conveyor, and includes a pivot engaging the support located on the input end so that the chute remains relatively stationary when the scrap leveler is moved between the raised and lowered positions.

10. The scrap handling system defined in claim 1 wherein the leveler includes a screw configured to move metal chip scrap, and further includes side sections that extend laterally from the screw to a location at least as far outboard as side walls of the container.

11. A scrap handling system for loading and leveling non-balling, flowable, metal chip scrap in an open-topped container, comprising:

a support;

a screw conveyor including an elongated housing having an input end pivoted to the support, an opposite end, and an open bottom, the screw conveyor further including a rotatable screw configured to move metal chip scrap along the housing from the input end to the opposite end and to deposit metal chip scrap out the open bottom into the container and to engage the metal chip scrap as the metal chip scrap is deposited out the bottom to better distribute and level the metal chip scrap throughout the container, the screw and the open bottom of the housing being configured to facilitate moving the metal chip scrap toward the opposite end as a first end of the container becomes filled; and a lift connected to the opposite end of the housing for moving the screw conveyor between a raised position that provides room to lift, remove, and replace the container, and a lowered position that positions the screw conveyor to deposit and spread the metal chip scrap toward an unfilled end of the container.

12. A scrap handling system for loading and leveling non-balling, flowable, metal chip scrap in an open-topped container, comprising:

a support;

a leveler including an elongated housing having an input end pivoted to the support, an opposite end, and an open bottom, the leveler further including a rotatable screw configured to deposit metal chip scrap into the container and to engage the metal chip scrap as the metal chip scrap is deposited to better distribute and level the metal chip scrap throughout the container, the screw and the open bottom of the housing being configured to facilitate moving the metal chip scrap toward the opposite end as a first end of the container becomes filled; and a lift connected to the opposite end of the housing for moving the scrap leveler between a raised position that provides room to lift, remove, and replace the container, and a lowered position that positions the leveler to deposit and spread the metal chip scrap toward an unfilled end of the container; the housing including side sections that extend laterally from the housing of the scrap leveler and extend at least as far as vertical side walls of the container, and wherein the side sections include outwardly angled panels shaped to flow moisture outwardly beyond the side walls of the container.

13. The scrap handling system defined in claim 12 wherein the housing includes an input end defining a chute for receiving metal chip scrap from a feeder conveyor, and includes a pivot engaging the support located on the input end so that the chute remains relatively stationary when the scrap leveler is moved between the raised and lowered positions.

14. A scrap handling system for handling non-balling, flowable metal chip scrap from a machining operation, comprising:

a bay having an area for receiving a roll-off container having side walls defining an open top;

a feeder conveyor for conveying metal chip scrap from the machining operation to the bay;

a scrap leveler including an input end positioned to receive metal chip scrap from the feeder conveyor, and further including a screw configured to engage the metal chip scrap as the metal chip scrap is deposited in the container to distribute and level the metal chip scrap in the container, the scrap leveler still further including side sections extending laterally from the screw for covering the open top out to the side walls;

a leveler support pivotally supporting the leveler at the input end; and a lift configured to move the scrap leveler between a raised position providing room to lift, remove, and replace the container, and a lowered position positioning the leveler to deposit the metal chip scrap in the container and to engage the metal chip scrap as the metal chip scrap is deposited in the container to level the metal chip scrap.

15. The scrap handling system defined in claim 14 wherein the leveler support comprises an overhead framework and posts supporting the overhead framework, and characteristically does not comprise a building with walls.

16. A method comprising steps of:

providing an area for an open-topped roll-off container and a leveler movably positioned in the area for movement between a raised position providing room to lift, remove, and replace the container, and a lowered position positioning the leveler to deposit non-balling, flowable, metal chip scrap in the container and to engage metal chip scrap that has been deposited in the container to level the metal chip scrap;

positioning an open-topped roll-off container in the area under the leveler;

moving the leveler to the lowered position where the leveler is parallel a top of the container, and operating the leveler to deposit and also level metal chip scrap in the container;

moving the leveler to a clearance position; and removing the container including lifting at least part of the container to haul the container away, the step of lifting the container being done after moving the leveler to the clearance position so that the container does not strike the leveler as the container is lifted and moved away, the step of lifting the container including pulling the container at an angle up onto a carrier on a truck.

17. A scrap handling system adapted to load and level non-balling, flowable, metal chip scrap in a roll-off container having an open top adapted to be carried on a truck, comprising:

a scrap conveyor including a housing and a screw configured to convey scrap along the housing and to deposit the scrap in the container, the housing of the scrap conveyor including a partially open bottom such that the scrap conveyor is configured to distribute any stacked up metal chip scrap previously deposited in the container; and a support pivotally supporting the scrap conveyor, the support including a lift configured to move the scrap conveyor between a raised position providing room to lift, remove, and replace the container, and a lowered position positioning the scrap conveyor proximate and parallel the open top so that the screw is positioned to deposit and evenly distribute the scrap in the container.

18. The scrap handling system defined in claim 17, wherein the lift is located overhead and is operably attached between the support and the housing.

* * * * *